US008577531B2

United States Patent
Semsey et al.

(10) Patent No.: US 8,577,531 B2
(45) Date of Patent: Nov. 5, 2013

(54) METHOD FOR THE AUTOMATIC CONTROL OF WHEEL BRAKE-SLIP AND WHEEL BRAKE-SLIP CONTROL SYSTEM FOR A MOTOR VEHICLE WITH AN ELECTRIC DRIVE

(75) Inventors: Ákos Semsey, Regensburg (DE); Michael Döricht, Kelkheim (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 98 days.

(21) Appl. No.: 13/388,456

(22) PCT Filed: Jul. 9, 2010

(86) PCT No.: PCT/EP2010/059890
§ 371 (c)(1),
(2), (4) Date: Feb. 2, 2012

(87) PCT Pub. No.: WO2011/015422
PCT Pub. Date: Feb. 10, 2011

(65) Prior Publication Data
US 2012/0130581 A1 May 24, 2012

(30) Foreign Application Priority Data

Aug. 5, 2009 (DE) .......................... 10 2009 036 250
Mar. 19, 2010 (DE) .......................... 10 2010 003 076

(51) Int. Cl.
*G06F 17/00* (2006.01)

(52) U.S. Cl.
USPC .............. 701/22; 701/70; 903/947; 188/71.5; 188/72.1; 188/71.8; 188/72.3; 188/72.8; 477/5; 310/328; 318/139; 318/162; 318/730

(58) Field of Classification Search
USPC ........ 701/22, 70; 903/3, 15, 20, 113.1, 113.5, 903/115.1, 116.1, 122.04, 152, 155, 191, 903/947; 188/71.5, 72.1, 71.6, 72.3, 72.8, 188/156, 158, 161, 162, 170, 171, 370; 192/18 A, 85.37; 477/5; 310/328; 318/139, 162, 730
See application file for complete search history.

(56) References Cited

U.S. PATENT DOCUMENTS 4,736,994 A * 4/1988 Fennel et al. ................. 303/159
5,657,829 A * 8/1997 May .............................. 180/197
(Continued)

FOREIGN PATENT DOCUMENTS

DE 10 2008 017 478 A1 10/2008
DE 10 2007 056 359 A1 5/2009

OTHER PUBLICATIONS

International Search Report—PCT/EP2010/059890—Oct. 19, 2010.

*Primary Examiner* — James P. Trammell
*Assistant Examiner* — McDieunel Marc
(74) *Attorney, Agent, or Firm* — Brinks Hofer Gilson & Lione

(57) ABSTRACT

A system and method for the automatic control of wheel brake-slip in a motor vehicle with an electric drive (2), including the following steps: detecting a brake signal (14) by means of a slip control device (9), at which point the slip control device (9) generates an electric drive signal (15) and a friction brake signal (16) for the automatic control of a predetermined slip value of a wheel (1) of the motor vehicle, transmitting the electric drive signal (15) to an electric drive control device (6) and transmitting the friction brake signal (16) to a friction brake control device (12), at which point a friction brake control device (12) activates a friction brake (10) of the wheel (1) according to the friction brake control signal (16) to generate friction brake signal (16) to generate friction brake torque and an electric drive control device (6) activates electric drive (2) according to electric drive signal (15) to generate electric drive torque. A wheel brake-slip control system for a motor vehicle with an electric drive and to a computer program which are capable of implementing the above described method.

10 Claims, 2 Drawing Sheets

(56) References Cited

U.S. PATENT DOCUMENTS

| | | | |
|---|---|---|---|
| 5,988,774 A * | 11/1999 | Jonner et al. | 303/189 |
| 6,122,588 A * | 9/2000 | Shehan et al. | 701/93 |
| 6,145,634 A * | 11/2000 | Holding | 188/72.8 |
| 6,193,021 B1 * | 2/2001 | Dieckmann et al. | 188/1.11 E |
| 6,199,650 B1 * | 3/2001 | Masberg et al. | 180/197 |
| 6,213,564 B1 * | 4/2001 | Face, Jr. | 303/3 |
| 6,848,756 B2 * | 2/2005 | Maron et al. | 303/155 |
| 7,387,349 B2 * | 6/2008 | Salamat et al. | 303/155 |
| 7,565,954 B2 * | 7/2009 | Kawahara et al. | 188/1.11 L |
| 7,744,167 B2 * | 6/2010 | Salamat et al. | 303/166 |
| 2004/0046448 A1 | 3/2004 | Brown | |
| 2009/0179486 A1 | 7/2009 | Ikeda et al. | |

* cited by examiner

METHOD FOR THE AUTOMATIC CONTROL OF WHEEL BRAKE-SLIP AND WHEEL BRAKE-SLIP CONTROL SYSTEM FOR A MOTOR VEHICLE WITH AN ELECTRIC DRIVE

CROSS REFERENCE TO RELATED APPLICATIONS

This application claims priority to German Patent Application Nos. 10 2009 036 250.9, filed Aug. 5, 2009, 10 2010 003 076.7, filed Mar. 19, 2010, and PCT/EP2010/059890, filed Jul. 9, 2010.

FIELD OF THE INVENTION

The invention relates to a method for performing closed-loop control of a wheel brake slip and to a wheel brake slip control system for a motor vehicle having an electric drive and operated by a computer program.

BACKGROUND AND SUMMARY OF THE INVENTION

It is known that vehicles having an electric drive which has an electric motor can be braked in a generator mode (which may include a so-called regenerative mode). During the generator-type braking, the electric motor is operated as a brake by operating the electric motor as a generator.

It is also known that this generator-type braking is switched off as soon as the vehicle movement dynamics control system becomes active. For example, the vehicle movement dynamics control system can be an anti-lock brake system (ABS), an electronic stability program (ESP), an ESC (electronic stability control) or a traction control system (TCS). The vehicle movement dynamics control then takes place only via one or more friction brakes. Although a friction brake can generate a high friction braking torque, the friction brake does not have sufficient dynamics to be able to set itself to a coefficient of friction of the road which changes quickly or suddenly. However, this means that the vehicle movement dynamics control system can no longer keep a wheel slip in a stable range. This has an adverse effect on the stability of the vehicle with respect to the driving behavior. That is to say the vehicle can, under certain circumstances, become dynamically unstable.

A further disadvantage is that the activation of the friction brake results in increased abrasion, which results in an increased quantity of fine friction material dust.

The object of the invention is therefore to provide a method for performing closed-loop control of a wheel brake slip and a wheel brake slip control system for a vehicle having an electric drive operated under control of a computer program, which overcome the above disadvantages.

The object is achieved by means of a method for performing closed-loop control of a wheel brake slip in accordance with this invention, by means of a wheel brake slip control system and by means of a computer program.

Preferred embodiments of the invention are the subject matter of this specification and claims.

The method according to the invention for performing closed-loop control of a wheel brake slip comprises the idea that when a vehicle movement dynamics control system becomes active, it is carried out not only by means of a friction brake but also with the aid of torque generated by the electric drive. The electric drive signals and friction brake signals which are generated by means of the slip control device correspond here, in particular, to setpoint values or target values. The electric drive generates an electric drive torque which can be positive or negative, wherein the electric drive comprises an electric motor. A positive electric drive torque causes the wheel to be driven. A negative electric drive torque causes the wheel to be braked. In the latter case, the electric motor is operated as a generator. A negative electric drive torque is also referred to below as a generator-type (regenerative) braking torque. The overall braking torque which is required for slip control is therefore obtained as the sum of the electric drive torque and of the friction braking torque, wherein the changes in torque which are fast but relatively small in amplitude are generated by the electric drive, and the remaining braking torques are generated by the friction brake. In particular, the friction brake generates a basic braking torque onto which the electric drive torque is applied and modulated. In the braking method according to the invention, a slip control is therefore carried out by means of the friction brake and the electric drive, for which reason the slip control can also be referred to as a cooperative slip control.

The advantages of this cooperative slip control arise, in particular, by virtue of the fact that the electric drive can quickly change its generated electric drive torque, and this torque which can be controlled quickly but is limited in magnitude ideally supplements the braking torque of the friction brake which can be controlled more slowly but is larger in absolute value. As a result, the vehicle movement dynamics control can be advantageously set to quickly changing vehicle situations, in particular if a coefficient of friction of the road changes.

If a vehicle with an electric drive is mentioned below, this is also intended to include electric drives which have more than one electric motor. In particular, one electric motor may be provided per wheel of a vehicle. That is to say each wheel can be driven or braked individually by means of an electric motor. However, it is also possible to provide that the vehicle has just one electric motor per axle, wherein driving or braking of the wheels takes place here in particular by means of a differential gear mechanism. In particular, in the latter case the torques which are required to perform slip control of the two wheels of the axle is divided into a common highly dynamic component, which is generated by means of the electric motor, and into two further wheel-specific components which are generated by means of the respective friction brakes of the wheels. The vehicle axle can also have, for example, double wheels. Furthermore, the vehicle can comprise not only an electric drive but also, for example, additionally comprise a gasoline engine or a diesel engine. Such vehicles are usually also referred to as hybrid vehicles.

According to one advantageous refinement of the invention it is possible to provide that an electric drive speed signal is measured and evaluated by means of an evaluation device which is connected to the slip control device. For example, the evaluation device can also be integrated into the slip control device. An electric drive speed signal can be generated, in particular, by means of an electric motor angle sensor (or shaft encoder), for example an electric motor position sensor, which is arranged, for example, in the electric motor for an internal magnetic field control. An electric motor speed which corresponds to a wheel speed of the wheel which is connected to the electric motor can therefore be advantageously measured more quickly and more precisely than in conventional slip control systems.

It can preferably be provided that a highly dynamic control process of the electric drive torque is carried out at least partially in the electric drive control device. The electric drive control device detects and evaluates, in particular, an electric drive speed. In particular, the electric drive control device comprises a magnetic field control for the electric motor. It is therefore advantageously made possible for the highly dynamic control of the braking effect of the electric motor to take place entirely or partially in the same electronic control device as the motor speed evaluation for the magnetic field control of the electric motor.

In another preferred embodiment of the invention, a friction brake torque is set to a smaller value than an electric drive torque if a generator-type braking torque which can be generated by means of the electric drive torque is greater than a braking torque which can be applied to a roadway. In such a driving situation, the generator-type braking effect alone is sufficient to perform closed-loop adjustment of the wheel to an optimum brake slip. In particular, under certain circumstances it is even possible here to dispense with activation of the friction brake, i.e. for the friction braking torque to be equal to 0. The friction brake therefore does not have to be activated. As a result, brake lining wear can be advantageously considerably reduced. Fine dust emissions and $CO_2$ emissions are therefore also clearly reduced. The distance or an air gap between a brake caliper and a brake disc of the friction brake is preferably set to zero. This means that the brake caliper on the brake disc slips to just such an extent that no friction braking effect is achieved. The friction brake is to this extent not in its position of rest. This has, in particular, the advantage that the friction brake can be activated directly and without a delay, for example if the coefficient of friction of the road changes.

According to the invention it is also possible to provide that electrical energy which is formed by means of the electric drive is at least partially converted into thermal energy if the electric drive torque is formed as a generator-type braking torque. In this context, in particular the kinetic energy which is generated during the braking process is at least partially fed as electrical energy to an electric resistor, in particular a braking resistor, for example a controlled braking resistor which then converts said electrical energy into thermal energy in the form of heat. This thermal energy can be conducted away, for example, by cooling or can be used as useful heat for further functions, for example heating a passenger compartment. The proportion of the electrical energy which is generated during the braking process and which is not converted into thermal energy is fed back, in particular, into an electrical energy store, with the result that this electrical energy can be made available to electrical consumers at later times. However, there may, in particular, also be provision that at least part of this proportion is fed directly to one or more electrical consumers. Reactive power can also preferably be generated in the electric motor by means of a control means of the electric drive without the electric drive torque changing. The additional electrical power loss which is generated as a result of this is carried away with the cooling of the motor and the windings in the electric motor therefore act as an integrated braking resistor.

The computer program according to the invention can be stored, for example, in a piece of firmware, wherein the firmware can be integrated, in particular, into the slip control device. The firmware is preferably implemented partially in the slip control device and partially in the electric drive control device.

BRIEF DESCRIPTION OF THE DRAWINGS

The invention will be explained in more detail below on the basis of preferred exemplary embodiments and with reference to figures. In the drawing.

DETAILED DESCRIPTION OF THE INVENTION

Figure 1:
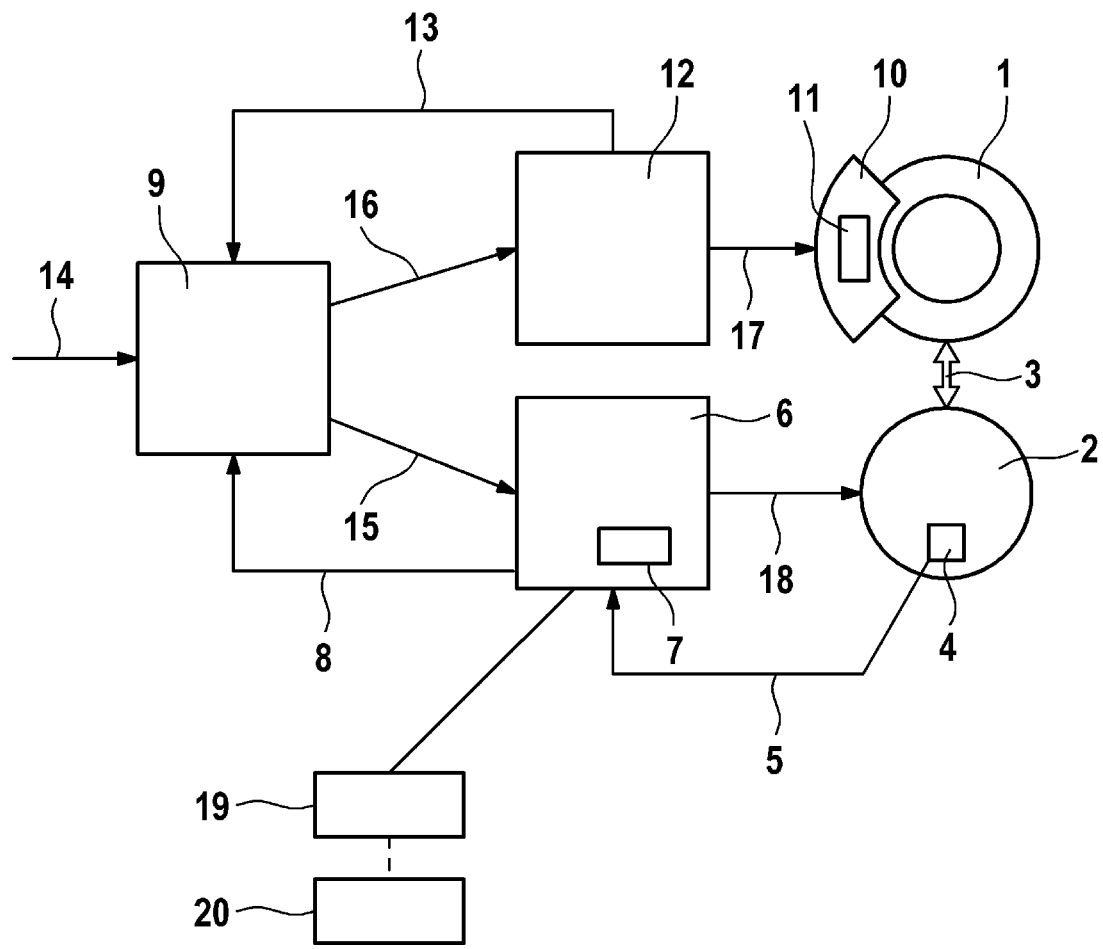
FIG. 1 shows a schematic arrangement of a wheel brake slip control system according to the invention with a plurality of vehicle components.

According to FIG. 1, a wheel 1 of a vehicle (not shown) is connected to an electric drive 2 by means of a mechanical connection 3. The vehicle can be, for example, a passenger car, a truck or a motor cycle. The electric drive 2 comprises an electric motor (not shown). In another exemplary embodiment of the invention which is not shown, the electric drive 2 can also comprise a plurality of electric motors, with the result that each wheel of the vehicle can be driven or braked individually by means of an electric drive. In a further embodiment of the invention which is not shown, the electric motor 2 drives an axle of the vehicle via a differential gear mechanism. In particular, the axle can comprise double wheels.

The electric drive 2 can either drive the wheel 1 or, if the electric motor is operated as a generator, can generate a generator-type braking torque, with the result that the wheel is braked. The electric drive 2 also comprises an electric motor angle (or angular speed) sensor 4 which generates an electric motor drive signal 5, wherein the electric motor drive signal 5 corresponds to an electric motor position signal or an electric motor speed signal. The electric motor drive signal 5 or the electric motor position signal is transmitted to an electric drive control device 6. An evaluation device 7, which measures and evaluates the electric motor drive signal 5, is integrated into the electric drive control device 6. The evaluated electric motor drive signal 5 corresponds to an electric motor speed signal 8 which is transmitted to a slip control device 9. An electric motor speed can therefore be measured.

In addition, the wheel 1 can be braked by means of a friction brake 10 which comprises a friction brake actuator 11. The friction brake 10 is subjected to closed-loop or open-loop control by means of a friction brake control device 12. The friction brake control device 12 is also designed to transmit friction brake state signals 13 to the slip control device 9. For example, friction brake state signals 13 can correspond to a brake pressure, a brake application force, braking torque or a brake temperature. In the embodiment shown in FIG. 1, the friction brake 10 is embodied as a hydraulic friction brake. In an embodiment of the invention which is not shown, the friction brake 10 can be embodied, in particular, as an electromechanical friction brake.

Exemplary embodiments of the method according to the invention for performing closed-loop control of a wheel brake slip will be described in more detail below.

The slip control device 9 detects a brake signal 14. The brake signal 14 can be calculated, in particular, from signals in accordance with an activation process of the brake pedal, a vehicle speed, a steering angle, a yaw rate and/or a lateral acceleration. The slip control device 9 generates an electric drive signal 15 and a friction brake signal 16 as a function of the detected brake signal 14. The electric drive signal 15 is transmitted to the electric drive control device 6. The friction brake signal 16 is transmitted to the friction brake control device 12.

The friction brake control device 12 will generate a friction brake actuator signal 17 as a function of the friction brake signal 16 and will transmit the friction brake actuator signal 17 to the friction brake 10. The friction brake 10 will activate the friction brake actuator 11 as a function of the friction brake actuator signal 17. The friction brake actuator 11 generates a friction brake torque which brakes the wheel 1.

Furthermore, the electric drive control device 6 will generate an electric drive control signal 18 as a function of the transmitted electric drive signal 15 and will transmit the electric drive control signal 18 to the electric drive 2 in order to perform closed-loop control of the electric drive 2. The electric drive 2 will generate an electric drive torque in accordance with the electric drive control signal 18. The wheel is driven or braked as a function of whether the electric drive torque has a positive or negative sign. If the wheel is braked, the generated electric drive torque is also referred to as a generator-type braking torque.

The slip control device 9 generates the electric drive signal 15 and the friction brake signal 16 in such a way that a predetermined slip value of the wheel 1 can be set. This is to say that the resulting total braking torque composed of the proportion of the friction braking torque which is generated by the friction brake 10 and that of the electric drive torque which is generated by the electric drive 2 does not cause the wheel 1 to rotate more slowly than as a result of a predetermined slip value which is known to the slip control device 9, wherein this slip value is, in particular, selected in such a way that a vehicle stability and a braking effect are optimal. In particular, the slip control device 9 evaluates, for the purpose of slip control, the electric motor speed signal 8 which is transmitted by the evaluation device 7.

Furthermore, the electric drive control device 6 is connected to an electric resistor 19 which is connected to a storage device 20 for storing thermal energy. The electric resistor 19 can be, for example, a braking resistor, in particular a controlled braking resistor. In an exemplary embodiment (not shown) it is possible to provide that the electric resistor 19 and/or the storage device 20 are/is integrated into the electric drive control device 6. In a further preferred embodiment (not shown) it is possible to provide that the electric drive 2 comprises the electric resistor 19. This makes it advantageously possible that electrical energy which is generated by means of the electric drive 2 can be converted into thermal energy. The storage device 20 makes it possible for the thermal energy which is converted by means of the electric resistor 19 to be stored in order to then make said thermal energy available, for example, for heating a passenger cell at a later time. Resistor 19 and storage device 20 could also be embodied in the form of an electrical storage device such as a battery.

Figure 2:
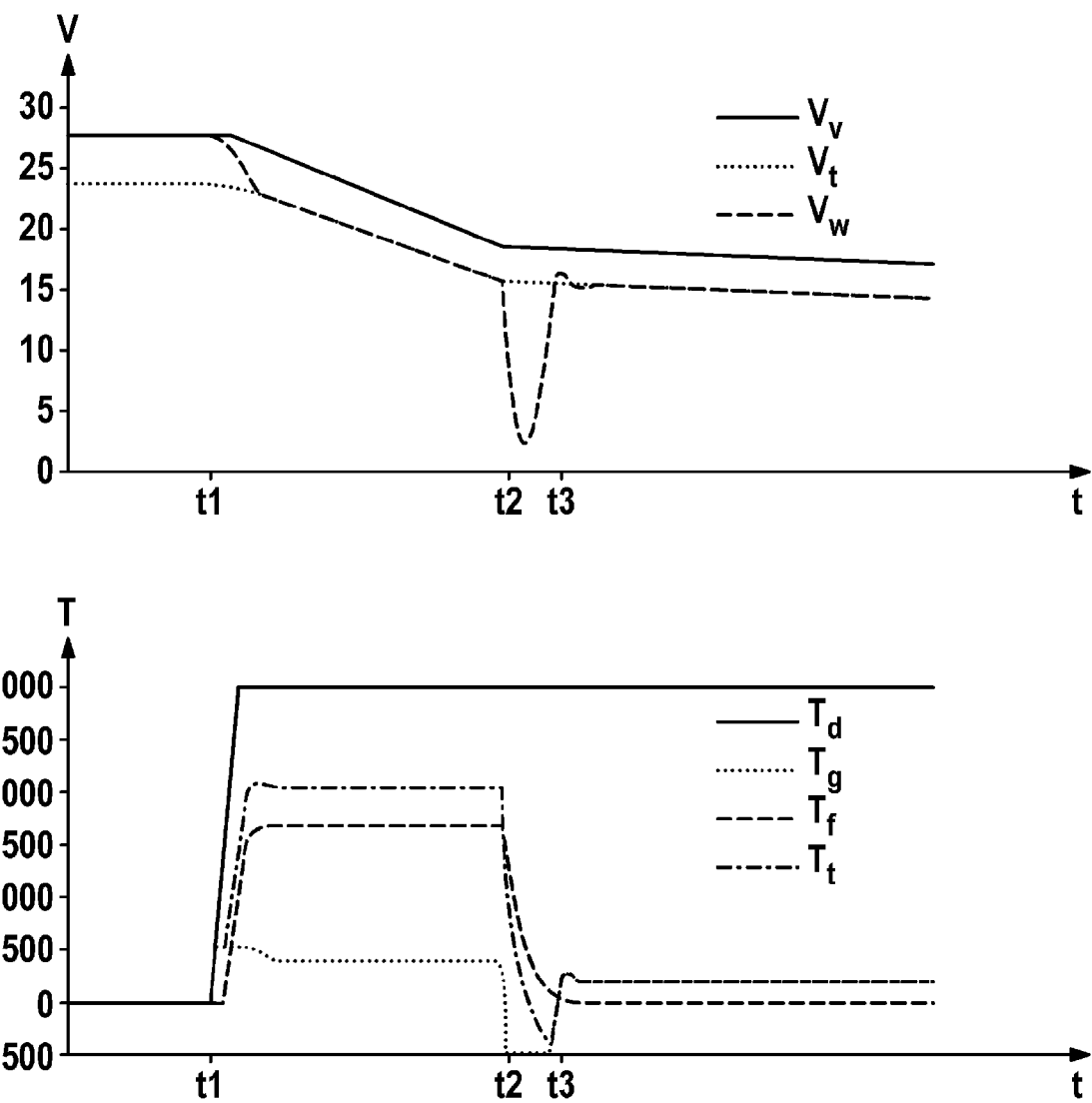
FIG. 2 shows two graphs which show a behavior of the method according to the invention in a driving situation with a varying coefficient of friction of the roadway.

FIG. 2 shows two graphs which explain in more detail the behavior of an exemplary embodiment of the wheel brake slip control system according to the invention or the method according to the invention in a driving situation with a varying coefficient of friction of the roadway. In the upper graph, the velocity is plotted against the time, with random units being selected for the axes here. The vehicle velocity $V_v$, a wheel target speed $V_t$ and a wheel speed $V_w$ are plotted here.

In the lower graph in FIG. 2, the individual torques T are plotted against the time t, with random units being also selected here. A driver braking request torque $T_d$ is plotted. This torque $T_d$ is the overall braking torque which is predefined by the driver on the basis of his activation of the brake pedal but which cannot be transmitted completely to the road as a braking effect in this way under certain circumstances, in particular if the roadway is wet or icy, or due to stability control constraints. However, this driver's braking request torque $T_d$ is also included in the calculation of the brake signal 14. Furthermore, an electric drive torque $T_g$, a friction braking torque $T_f$ and the overall braking torque $T_t$ which results from the electric drive torque $T_g$ and the friction braking torque $T_f$ are shown.

At the time $t_1$, the driver activates the brake pedal. As is apparent from the lower graph, the signal $T_d$ rises quickly to a value which cannot be completely transmitted to the road as a braking effect. The slip control device 9 will therefore generate an electric drive signal 15 in such a way that the electric drive control device 6 performs closed-loop control of the electric drive by means of a corresponding electric drive control signal 18 in such a way that the electric motor of the electric drive 2 operates as a generator, with the result that a generator-type braking torque $T_g$ is generated. The electric drive signal 15 corresponds here to a setpoint value. The control of the electric drive 2 itself is carried out by means of the electric drive control device 6. This has, in particular, the advantage that as a result highly dynamic control of the electric drive 2 possible since the communication connection, in particular a bus connection, between the electric drive control device 6 and the electric drive 2 is much faster than a communication connection between the slip control device 9 and the electric drive control device 6, which is usually in the range of greater than 10 ms. As is apparent from the lower graph, this generator-type braking torque $T_g$ rises very quickly to its maximum value in order to generate a braking effect as quickly as possible.

In addition, the slip control device 9 will generate a friction brake signal 16, with the result that the friction brake control device 12 generates a corresponding friction brake actuator signal 17 and transmits the latter to the friction brake 10 in order to activate the friction brake actuator 11. The friction brake torque $T_f$ rises more slowly than the generator-type braking torque $T_g$, but then takes over the greater part of the overall braking torque $T_t$. In an analogous fashion, the friction brake signal 16 corresponds to a setpoint value. The actual control of the friction brake 10 is carried out by means of the friction brake control device 12.

Up to the time $t_2$, a coefficient of friction of the road is present which permits the transmission of braking forces which are relatively high but which do not completely meet the driver's specification. This means that the wheel runs in the slip-controlled mode, for example of an ABS controller. In order to transmit the braking force which is the maximum possible one for the respective coefficient of friction of the road, a characteristic difference must be present between the vehicle velocity $V_v$ and the wheel speed $V_w$, i.e. the wheel must be adjusted to the predefined wheel target speed $V_t$.

At the time $t_2$, the coefficient of friction of the road decreases suddenly to a value which permits only the transmission of braking forces which are significantly lower than the driver's braking request torque $T_d$. The electric drive torque $T_d$ of the electric drive 2 is then reduced very quickly and the electric motor 2 acts even as a drive in order to counteract the slowly reducing friction braking torque $T_f$ which is too large for this coefficient of friction of the road, and therefore to reduce a tendency of the wheel 1 to lock and/or to accelerate the wheel in order to rapidly reach the wheel target speed $V_t$ which is necessary for the optimum overall braking torque $T_t$ and for the vehicle stability.

Starting from the time $t_3$, the friction braking torque $T_f$ is still somewhat further reduced to a value which in all cases precludes locking of the wheel 1 owing to the currently acting coefficient of friction of the road. In order to maintain the maximum transmissible braking torque, the electric drive torque $T_g$ of the electric motor is then increased again in opposition to the decreasing of the friction braking torque $T_f$. The friction braking torque $T_f$ therefore constitutes a basic braking torque onto which the electric drive torque $T_g$ is modulated, which friction braking torque $T_f$ can then be very quickly adapted to the slip behavior of the wheel 1 and advantageously permits highly dynamic fine correction of the overall braking torque $T_r$. The wheel with the slip value which is the optimum one for the stability of the vehicle and that for the length of the braking distance therefore runs by means of the braking method according to the invention. As a function of the coefficient of friction of the road, in particular in the case of a low coefficient of friction, the optimum brake slip requires only a very limited overall braking torque $T_r$, which can even be generated almost exclusively by means of the electric drive torque $T_g$, with the result that a negligible friction braking torque $T_f$ can be generated. A situation starting from the time $t_3$ is therefore illustrated in the graphs in FIG. 2.

In a particularly advantageous embodiment of the invention which is not shown here, the electric motor drive control device 6 carries out an integrated electric motor speed control process in a power inverter (not shown), which electric motor speed control process has its target speed prescribed to it by the brake controller/vehicle movement dynamics controller and carries out the highly dynamic torque control itself when there is a requirement for slip control.

The fact that the electric drive 2 can very quickly change the drive-type or generator-type braking torque generated by it—and can therefore even act in a driving fashion on the braked wheel insofar as it is advantageous for the setting of the wheel slip—and this torque which can be adjusted very quickly but is limited in magnitude is modulated onto the braking torque of the friction brake which can be controlled more slowly but is greater in terms of absolute value, provides, in particular, the following advantages, in particular if the electric drive 2 has at least one motor position sensor for controlling an internal magnetic field, since as a result a motor speed and therefore the wheel speed can be measured more quickly and more precisely than in conventional slip control systems:

- The vehicle movement dynamics control functions (ABS, ESC, TCS) can implement much more precise slip control, as a result of which both the utilization of the coefficient of friction and therefore the braking distance and also the driving comfort and the dynamic loading of the chassis are improved.
- The friction brake can be configured for a relatively low dynamic requirement and can therefore be manufactured more cost-effectively.
- If the friction brake is embodied as a hydraulic friction brake, the modulation frequency thereof can be reduced for the brake pressure control, which has an advantageous effect on the pedal reaction and the generation of noise.
- If the friction brake is embodied as an electromechanical brake, the configuration thereof can be concentrated more on reducing the manufacturing costs and optimizing the power loss and less on the otherwise critical dynamic requirements. It is therefore possible to embody the electromechanical brake also as an electromechanical wheel brake, in particular a front wheel brake, with a 12V operating voltage.
- Improved driving dynamic functionality such as, for example, shortened braking distance, reduced pedal vibration and relatively low generation of noise during the slip control processes.
- Improvement of comfort by reduced pedal vibration during an ABS braking process, in particular in the case of a hydraulic friction brake.
- Reduced dynamic loading of the chassis during ABS and ESC control processes.
- More cost-effective embodiment of brake actuators, in particular in an electromechanical friction brake.

According to the invention, the computer program can be stored and executed, in particular, in a vehicle movement dynamics control device, in particular in an ABS/VSC ("vehicle stability control") control device.

In summary, the invention provides a wheel brake slip control system and a method for controlling a wheel brake slip which combine the respective advantages of a friction brake and of an electric drive with one another, with the result that respective possible disadvantages can be compensated and/or overcome in a synergetic fashion.

While the above description constitutes the preferred embodiment of the present invention, it will be appreciated that the invention is susceptible to modification, variation, and change without departing from the proper scope and fair meaning of the accompanying claims.

The invention claimed is:

1. A method for performing closed-loop control of a wheel brake slip for a vehicle having an electric drive (2), comprising the steps of:
    detecting a brake signal (14) by means of a slip control device (9), wherein the slip control device (9) generates an electric drive signal (15) and a friction brake signal (16) for performing closed-loop control of a predetermined slip value of a wheel (1),
    transmitting the electric drive signal (15) to an electric drive control device (6), transmitting the friction brake signal (16) to a friction brake control device (12), wherein the friction brake control device (12) activates a friction brake (10) of the wheel (1) in accordance with the friction brake signal (16) in order to generate a friction brake torque, and the electric drive control device (6) activates the electric drive (2) in accordance with the electric drive signal (15) in order to generate an electric drive torque.

2. The method for performing closed-loop control of a wheel brake slip as claimed in claim 1, wherein the electric drive control device (6) also detects and evaluates a motor speed of the electric drive (2).

3. The method for performing closed-loop control of a wheel brake slip as claimed in claim 1, wherein a wheel of the vehicle is braked individually by means of the friction brake (10) and the electric drive (2).

4. The method for performing closed-loop control of a wheel brake slip as claimed in claim 1, wherein at least one vehicle axle having two or more wheels is braked by means of the friction brake (10) and the electric drive (2).

5. The method for performing closed-loop control of a wheel brake slip as claimed in claim 1, wherein the friction brake torque is set to a smaller value than the electric drive torque if a generator-type braking torque which can be generated by means of the electric drive torque is greater than a limiting braking torque which can be applied to a roadway.

6. The method for performing closed-loop control of a wheel brake slip as claimed in claim 1, wherein, when the electric drive torque is formed as a generator-type braking torque, electrical energy which is formed by means of the electric drive (2) is at least partially converted into thermal energy by means of an electrical resistor (19).

7. A wheel brake slip control system for a vehicle having an electric drive (2), comprising:
    a friction brake control device (12) activating a friction brake (10) of a wheel (1) of the vehicle, an electric drive control device (6) for performing closed-loop control of the electric drive (2), a slip control device (9) for detecting a brake signal (14) and generating, in accordance with the detected brake signal (14), a friction brake signal (16) and an electric drive signal (15) for setting a predetermined slip value of the wheel, wherein the slip control device (9) is connected to the friction brake control device (12) in order to transmit the friction brake signal (16), and to the electric drive control device (6) in order to transmit the electric drive signal (15).

8. The wheel brake slip control system as claimed in claim 7, wherein an evaluation device (7) which is connected to the slip control device (9) is provided and measures and evaluates an electric drive speed signal (18).

9. The wheel brake slip control system as claimed in claim 7, wherein a storage device (20) for storing thermal energy is thermally connected to the electric drive (2).

10. A non-transitory computer program having program code for carrying out the method as claimed in claim 1 when the computer program is run on a computer.

\* \* \* \* \*